Figure 1:
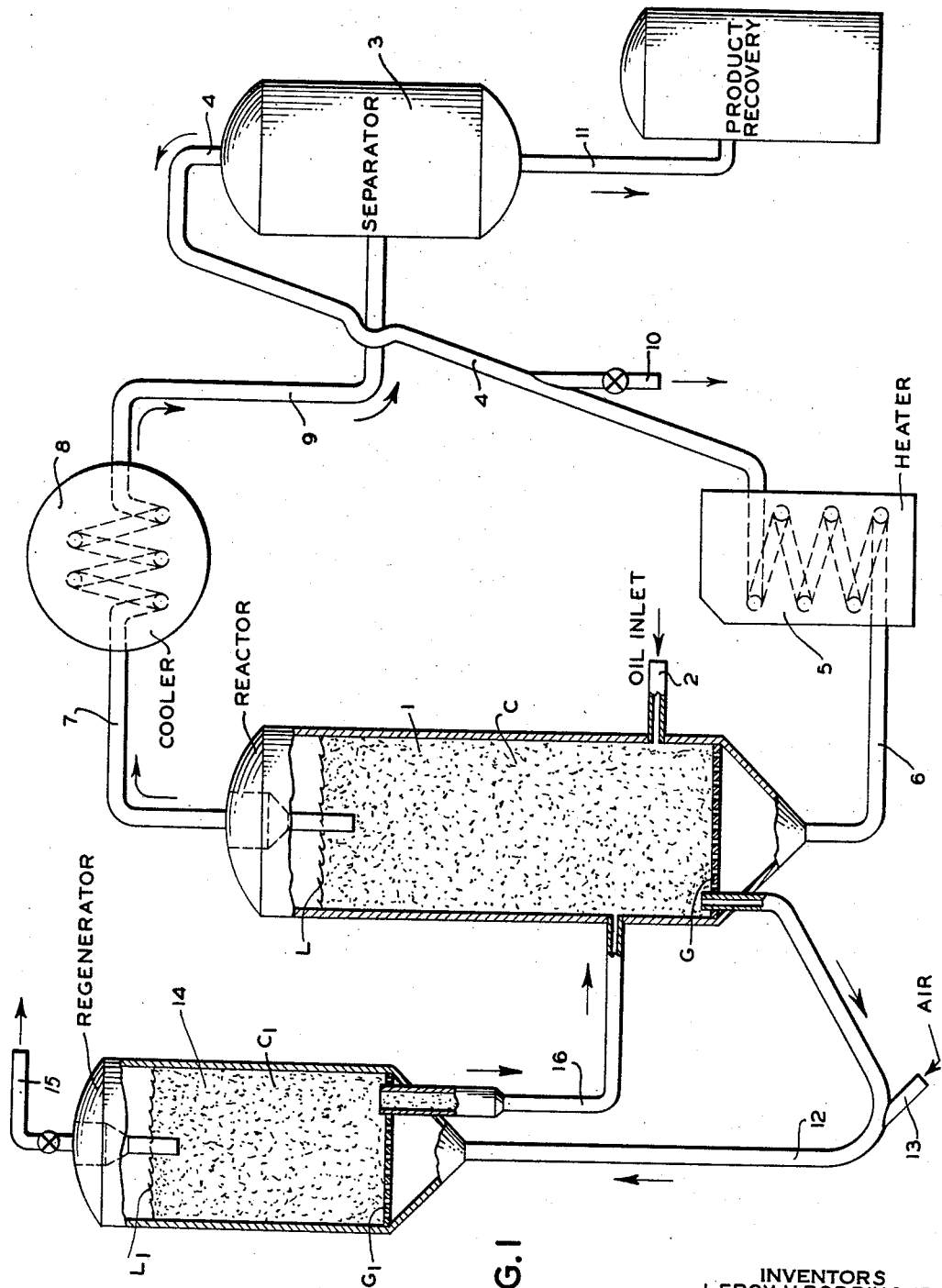

United States Patent Office 2,905,631
Patented Sept. 22, 1959

2,905,631

REGENERATION OF HYDROFORMING CATALYSTS CONTAINING SULFUR INACTIVATING DEPOSITS

Leroy V. Robbins, Jr. and Lloyd A. Nicolai, Baton Rouge, La., assignors to Esso Research and Engineering Company, a corporation of Delaware Application May 20, 1954, Serial No. 431,226

9 Claims. (Cl. 208—136)

The present invention relates to improvements in the hydroforming of naphthas to produce a product of increased octane number. More particularly, the present invention relates to improvements in the hydroforming of naphthas using a fluidized catalyst in a two vessel system comprising a reaction vessel and a catalyst regeneration vessel in which the catalyst is subjected to regeneration under controlled conditions.

Hydroforming is defined as an operation in which a naphtha, usually a virgin naphtha, but also including a cracked naphtha, or a mixture of the two, is subjected at elevated temperatures and pressures in the presence of added hydrogen to the influence of a catalyst whereby naphthenes contained in the said naphtha are dehydrogenated to the corresponding aromatic, wherein also straight chain paraffins are isomerized to form branched chain paraffins, wherein also straight chain paraffins, such as normal heptane, are first cyclicized and thereafter dehydrogenated to form, for example, toluene, and finally, high boiling paraffins are cracked to form lower boiling material. The result of this process is to form a gasoline product of improved octane rating due to the fact that aromatics and branched chain paraffins are formed.

An important feature of hydroforming has regard to the method in which the catalyst is regenerated. In other words, during the hydroforming operation, carbonaceous and other deposits are formed on the catalyst, which deposits must be removed.

These deposits impair the activity of the catalyst and these must be removed by treating the said catalyst with an oxygen-containing gas. It is realized that the prior art contains disclosures of removing such deposits by treatment of the catalyst with an oxygen-containing gas. However, the present invention involves treating the contaminated catalyst in a regeneration zone under special conditions as will be more fully and at large set forth hereinafter.

The main object of the present invention is to provide a process wherein a naphtha is hydroformed under conditions such that a high yield of high octane gasoline is produced.

Another object of the present invention is to regenerate a fouled hydrocarbon conversion catalyst under conditions such that the fumes issuing from the regeneration vessel are low in free oxygen content, namely, contain more than zero but less than 1% free oxygen by volume.

Another object of the present invention is to regenerate a catalyst fouled during the hydroforming of a high sulfur naphtha using undiluted air as the regeneration gas under conditions during regeneration such that sulfur as well as carbonaceous contaminants are reduced to a low value.

Another object of the present invention is to regenerate a hydroforming catalyst which has been utilized in hydroforming a sulfur-containing feed under such conditions as to remove sulfur deposits, formed on the catalyst during the productive phase of the operation, as sulfur dioxide.

Another object of the present invention is to carry out a hydroforming operation utilizing the fluidized catalyst technique in a two zone system comprising a reaction zone and a catalyst regeneration zone, maintaining conditions in the regeneration zone to which is fed an oxygen-containing gas having an oxygen concentration equal to that of air, under such conditions as to limit the concentration of free oxygen in the fumes or flue gas issuing from the said regeneration zone to a value greater than zero but not exceeding 1% by volume.

Numerous other objects of the present invention will be apparent from the following more detailed description and claims.

Figure 2:
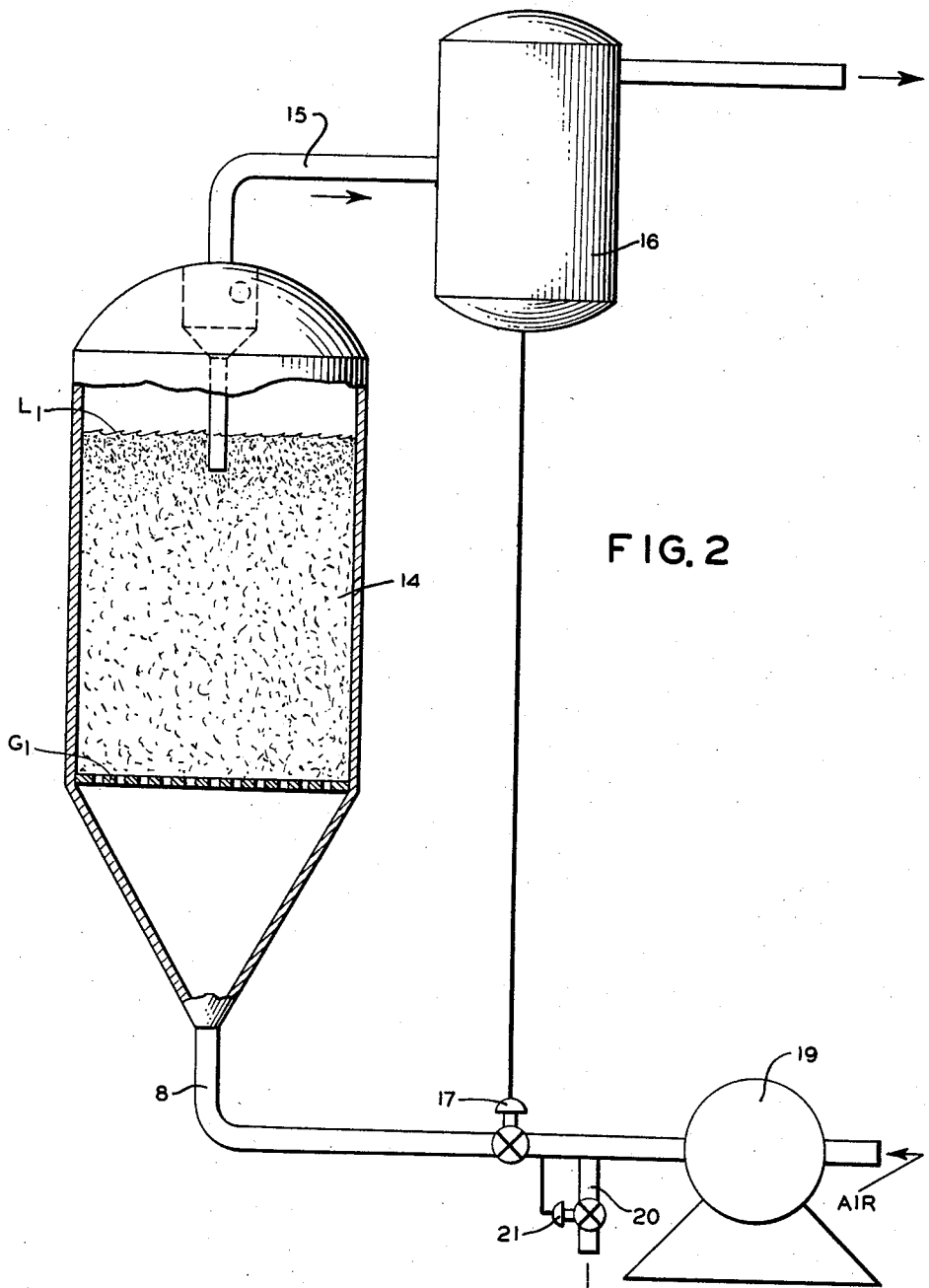

In the accompanying drawing there is set forth, diagrammatically, in Fig. 1 the essential components of a commercial hydroforming unit; in Fig. 2, there is depicted in detail the auxiliary equipment which enables the catalyst regeneration vessel to be operated in accordance with the present invention.

Similar reference characters refer to similar parts throughout the views.

Referring in detail to Fig. 1, 1 represents a hydroforming reactor of conventional design, which contains a bed of fluidized hydroforming catalyst, which catalyst may be composed of, say, 10 weight percent molybdenum oxide carried on a 90 weight percent active form of alumina, or it may be composed of 0.1–0.3 weight percent of platinum, the remainder being a support such as activated alumina. The present invention, therefore, contemplates the use of any known hydroforming catalyst, which catalyst is a form of a powder of fluidizable particle side and particle size distribution. The bed of powdered catalyst C extends from a gas distributor G to an upper dense phase level L. Above L in reactor 1 there is a disengaging space wherein the main bulk of the catalyst is separated from oil vapors and returned to the main bed C aided by a plurality of "cyclones" (not shown), or the like, disposed in the top of the reactor 1. Preheated and vaporized oil enters the reactor 1 through inlet line 2, and simultaneously, a hydrogen-containing gas recovered from a separator 3 is passed via line 4 to furnace 5 to line 6 and thereafter passed into the bottom of reactor vessel 1 wherein it passes upwardly through the gas distributing means G, which may be a grid or a screen, or other known equivalent. It is to be noted that the vaporized and preheated oil enters at a point above the gas distributor G. This is done to prevent thermal cracking of the naphthenes contained in the oil prior to the introduction of the oil into the reactor by avoiding admixture of the oil with the hot hydrogen gas in line 6. Under known conditions of temperature, pressure and contact time, the desired hydroforming reaction occurs and the hydroformed vapors pass from the bed of catalyst C upwardly and issue through line 7. These vapors are cooled in 8 to a temperature of about 100° F. and thence passed via line 9 to separator 3. In this separator a hydrogen containing gas is withdrawn overhead through line 4 as previously indicated and recycled to reactor 1. A portion of this gas in line 4 may be rejected from the system through line 10. The liquid product cooled in separator 3 is passed via line 11 to a product recovery system wherein it is subject to conventional distillation and other purifying means to recover the desired hydroformed product.

The catalyst in reactor 1 acquires deactivating deposits containing carbonaceous material, and in some cases where the feed is high in sulfur also acquires substantial deposits of sulfur-containing material. To reactivate and restore the activity of the catalyst, it is either continuously or intermittently withdrawn from reactor 1 via a standpipe 12 and charged into an air stream in line 13 wherein it is formed into a suspension and carried into the bottom of regenerator 14 where, again, it is formed into a dense fluidized bed $C_1$ extending from a grid or other foraminous member $G_1$ to a upper dense phase level $L_1$. Under conditions more fully set forth hereinafter the desired regeneration of the catalyst takes place in regenerator 14 and the regeneration fumes are withdrawn overhead through line 15. The regenerated catalyst is returned to reactor 1 via line 16.

The engineer experienced in the art to which the present invention relates will realize that much auxiliary equipment would be both desirable and necessary in a commercial unit. However, in the interest of simplicity and to direct attention to the present invention, the drawings have been simplified to indicate merely the equipment necessary to illustrate the invention clearly, and thus, showings of temperature recording and controlling means, pressure recording and controlling means, pumps, reheating furnaces, fluidized standpipes and the like have been omitted because at this stage of the development in this art, this equipment is conventional in processes utilizing the fluidized catalyst technique.

Referring now to Fig. 2, the regenerator 14 is shown in enlargement and with the added auxiliary equipment necessary to achieve the improvement contemplated by the present invention. Vent line 15 is in communication with an oxygen analyzer 16. This analyzer is a device that may be purchased from any number of domestic instrument manufacturers. This analyzer 16 is in operative communication with a valve 17 in line 18 through which air is forced by an air blower 19 to control the rate of air flow to the regeneration vessel 14 to that quantity sufficient to oxidize the carbonaceous and sulfur material, but oxidizing the latter, merely to the extent that $SO_2$ is formed. In other words, when treating a high sulfur feed, the catalyst becomes contaminated in the hydroforming vessel with sulfur-bearing material. In some cases where, for example, the hydrogenation-dehydrogenation component of the catalyst is molybdenum oxide, molybdenum sulfide is formed which is inactive. Now, when this catalyst containing molybdenum sulfide is regenerated the sulfur associated with or combined with the catalyst should be oxidized merely to the extent that $SO_2$ is formed, for this $SO_2$ may then be withdrawn overhead through line 15. However, experience has shown that $SO_3$ may be formed during the regeneration of the catalyst, and this material adsorbs on the catalyst and is carried back to the reactor where it is reduced to yield $H_2S$ which again reacts with the molybdena to form more molybdenum sulfide, thus building up the sulfur level on the catalyst and destroying the active catalytic agent, molybdenum oxide.

As indicated, the present invention provides a method for regenerating the catalyst so that sulfur is removed overhead from the regenerator as $SO_2$ and substantially no $SO_3$ is formed. This procedure has been found to improve the operation very greatly as will more fully appear hereinafter in the form of a specific example based on data obtained during the operation of a relatively large pilot plant.

Referring again to Fig. 2, the oxygen analyzer 16 controls the quantity of air pumped via line 13 into regenerator 14 so as to cause the complete oxidation of carbon, hydrogen and sulfur, and at the same time to limit the amount of oxygen fed to regenerator 14 so as to cause the fumes exiting from regenerator 14 to contain more than zero mol percent free oxygen but not more than 1% free oxygen so the sulfur is oxidized merely to $SO_2$. The oxygen analyzer may be any standard type, such as, the Model G-2 Beckman oxygen analyzer, which activates valve 17 in line 18, carrying the air from the blower to the regenerator. If the oxygen in the vent gas starts to increase toward any undesired value due to any number of process causes, the air supply is reduced. When, for example, the oxygen of the vent gas increases to a predetermined value, say, 0.8 vol. percent, the control mechanism on the oxygen analyzer pinches down on valve 17 so that less air enters the bottom of the regenerator. Contrariwise, if the oxygen in the vent gas decreases to, say, 0.2 vol. percent, the control mechanism opens valve 17 and allows more air to enter the regenerator. Blower 19 must be operated at sufficient speed to always supply an excess of air, and vent line 20 containing control valve 21 must be supplied to maintain a constant pressure upstream of valve 17. This manipulation of control valves 17 and 21 may be automatic or manual.

It is appreciated that prior to this invention others have regenerated catalyst using as regeneration gas a material containing air diluted with inert material, such as flue gas, nitrogen, etc. This type of operation has the disadvantage that much larger quantities of gas must be fed to the regeneration zone, thus requiring a great amount of equipment including storage vessels for regeneration fumes and additional pumps and piping. The present invention utilizes air, or even oxygen enriched air, thus greatly reducing the amount of gas that need be handled in carrying out the regeneration and only limits the amount of free oxygen issuing from the regenerator.

In order to more fully explain the present invention, the following specific example comprising a fluidized catalyst run was made on a high sulfur feed, the inspection of which is set forth below together with an inspection of the product to show the improvement.

EXAMPLE 1

*Conditions in hydroforming reactor*

| | |
|---|---|
| Catalyst composition | 10% $MoO_3$ on 90% alumina |
| Temperature, ° F | 900 |
| Pressure, p.s.i.g | 200 |
| Oil feed rate, B./D | 64 |
| Standard cubic feet of hydrogen fed to reactor per barrel of oil | 4500 |
| Concentration of hydrogen in recycled hydrogen-containing gas, mol percent | 64 |
| Duration of run, hours | 167 |

*Conditions in the regenerator*

| | |
|---|---|
| Temperature, ° F | 1080–1140 |
| Pressure, p.s.i.g | 200 |
| Concentration of oxygen in regeneration gas | 21.0 |
| Concentration of oxygen in regeneration fumes, vol. percent | 0.1 to less than 1.0 |
| Wt. percent S on regenerated catalyst | 0.03–0.04 |
| Wt. percent $SO_4$ on regenerated catalyst | 0.05–0.10 |

*Inspection of feed and product*

| | |
|---|---|
| Feed: | |
| Boiling range, ° F | 244–323 |
| Wt. percent sulfur | 0.13 |
| Research octane number | 42.3 |
| Product: | |
| Boiling range, ° F | 124–396 |
| Vol. percent $C_5^+$ hydrocarbons | 81.1 |
| Dry gas, wt. percent | 9.8 |
| Wt. percent sulfur | 0.0012 |
| Research octane number (clear) | 94.2 |
| Research octane number+3% TEL | 100.3 |

The above inspections of feed and product show a reduction in sulfur content of the feed from 0.13 weight percent to 0.0012 weight percent in the product and large octane improvement.

In Example 2, there are set forth two periods of a hydroforming run using the same catalyst as in Example 1 under the same hydroforming conditions, except that during the catalyst regeneration, the $O_2$ content of the regeneration fumes was as specified below:

EXAMPLE 2

| Run | 17K2 As determined | 17K3 | |
|---|---|---|---|
| | | As determined | Adjusted to— |
| Reaction temp., °F | 898 | 900 | 898 |
| Pressure, p.s.i.g | 200 | 200 | |
| w./hr./w.[1] | .64 | .61 | .64 |
| Catalyst to oil ratio | 1.37 | 1.12 | |
| Recycle gas C.F./B. feed | 4,710 | 4,810 | |
| Percent $H_2$ in recycle | 66.0 | 64.7 | |
| Vol. percent $C_5+$ | 81.4 | 82.0 | |
| Research octane number clear | 94.8 | 93.4 | 92.3 |
| Mol percent $O_2$ in vent regenerator gas | 0.1–0.5 | 1.0–1.5 | |
| Wt. percent sulfur on regenerated catalyst | .04 | 0.10 | |
| Regeneration temp., °F | 1,120–1,140 | 1,120–1,140 | |

[1] W./hr./w. = weight of oil fed to reactor per hour per pound of catalyst.

Further tests were conducted on a high sulfur feed naphtha under normal hydroforming conditions using a fluidized bed of catalyst containing 10% $MoO_3$ and 90% $Al_2O_3$, by weight, the conditions being as follows:

| | |
|---|---|
| Reactor temperature °F | 900 |
| Pressure p.s.i.g | 200 |
| W/hr./w | 0.6 |
| Catalyst/oil ratio | 1 |
| $H_2$ recycle gas feed rate s.c.f./bbl. feed | 4500 |
| $H_2$ in recycle gas vol. percent | 60–75 |

The catalyst was regenerated with air at system pressure at about 1100° F. and conditions were adjusted so that free oxygen appeared in the fumes as indicated in the below table:

| | Mol Percent $O_2$ in Regen. Flue Gas | Wt. Percent Sulfur on Regen. Cat. | Octane No. on $C_5+$ Hydroformate |
|---|---|---|---|
| 1 | 0.2 | 0.03 | 95 |
| 2 | 0.4 | 0.04 | 95 |
| 3 | 0.8 | 0.06 | 95 |
| 4 | 1.1 | 0.1 | 94 |
| 5 | 1.5 | 0.1 | 93 |
| 6 | 4.6 | 0.15 | 91 |

It will be noted from the above data that a distinct drop in octane rating resulted as the oxygen content in the regeneration flue gas increased above 1%. It will be noted that the sulfur content of the regenerated catalyst is a direct function of the mol percent oxygen in the regenerator flue gas.

To recapitulate briefly, the present invention comprises operating a hydroforming plant under improved conditions, particularly, with respect to the manner in which the hydroforming catalyst is regenerated when a high sulfur feed is treated. In brief compass, the regeneration of the catalyst was accomplished, in the prior practice with diluted air but it did not teach, as does the present invention, the use of straight air or oxygen enriched air, as a regeneration gas, in such quantity as to oxidize the catalyst poisons and contaminants completely or substantially completely, but limiting the air fed to the regeneration zone to the extent that the regeneration fumes contain some free oxygen but less than 1% thereof. The present invention, therefore, involves the concept of feeding substantially that amount of oxygen only to the regeneration zone which will cause oxidative combustion of carbonaceous and sulfur material to remove substantially all of such contaminating material from the catalyst, the oxidation of sulfur being limited to $SO_2$ formation, which $SO_2$ is removed overhead with the regeneration fumes.

The naphtha to be hydroformed, according to this invention, may be virgin naphtha, an olefin-containing naphtha fraction, a mixture of the two, high sulfur feed naphtha, desulfurized naphtha or a naphtha such as that from a Kuwait feed stock. However, the present improvements are particularly effective in treating high sulfur naphthas, as stated.

Many modifications of the present invention will be apparent to those who are familiar with this art without departing from the spirit thereof.

What is claimed is:

1. In the regeneration of a catalyst contaminated with carbonaceous and sulfur-containing inactivating deposits, the improvement which comprises treating said contaminated catalyst charged to a fluidized bed of the catalyst with an oxygen-containing gas having an oxygen concentration at least equal to that of air passed into the bottom of said fluidized bed, under regeneration conditions of temperature and controlling the amount of oxygen-containing gas fed to the regeneration to that required to effect oxidative removal of the said deposits, the sulfur oxidation being limited to $SO_2$ formation, and such additional amount as to permit withdrawing from said fluidized bed of catalyst undergoing regeneration, fumes containing some but less than 1% free oxygen.

2. The method set forth in claim 1 in which the catalyst is a hydroforming catalyst.

3. The method set forth in claim 1 in which the catalyst comprises molybdenum oxide carried on active alumina.

4. In the hydroforming of naphthas containing a substantial amount of sulfur conducted in the presence of a fluidized bed of a sulfur sensitive catalyst which becomes contaminated with carbonaceous and sulfur-containing deposits during the said hydroforming operation, the improvement which comprises maintaining the said catalyst in an active state which comprises treating the catalyst contaminated with carbonaceous and sulfur-containing deposits charged to a fluidized bed of the catalyst undergoing regeneration with air at elevated temperatures whereby the carbonaceous and sulfur-containing deposits are converted to gasiform compounds which are withdrawable from the catalyst as regeneration fumes and controlling the air supply to the bottom of said fluidized bed of said catalyst undergoing regeneration so as to provide sufficient oxygen to the regeneration to gasify said contaminants and to permit withdrawal from said fluidized bed of catalyst undergoing regeneration of the regeneration fumes containing some free oxygen but less than 1% free oxygen.

5. The method set forth in claim 4 in which the catalyst is molybdenum oxide carried on a suitable support.

6. The method set forth in claim 4 in which during the regeneration insufficient oxygen is supplied to the said regeneration to convert any substantial portion of the sulfur associated with the catalyst to $SO_3$.

7. The method set forth in claim 4 in which the sulfur associated with the catalyst during regeneration is removed therefrom as sulfur dioxide.

8. The method set forth in claim 4 in which during the regeneration the amount of air fed to the fluidized bed of catalyst undergoing regeneration is varied responsive to the oxygen content of the regeneration fumes withdrawn from said fluidized bed.

9. The method set forth in claim 4 in which the amount of air fed to the fluidized bed of catalyst undergoing regeneration is such as to effect the regeneration and limit the amount of free oxygen in the regeneration fumes to a value of from about 0.2–0.8 volume percent.

References Cited in the file of this patent

UNITED STATES PATENTS

| | | |
|---|---|---|
| 2,403,052 | Cole et al. | July 2, 1946 |
| 2,409,751 | Gerhold et al. | Oct. 22, 1946 |
| 2,414,002 | Thomas et al. | Jan. 7, 1947 |
| 2,602,771 | Munday et al. | July 8, 1952 |
| 2,695,866 | McGrath | Nov. 30, 1954 |
| 2,808,366 | Nicholson et al. | Oct. 1, 1957 |